(12) United States Patent
Mendelsohn

(10) Patent No.: US 6,771,886 B1
(45) Date of Patent: Aug. 3, 2004

(54) METHOD AND APPARATUS TO ADAPTIVELY PROGRAM A RECORDING DEVICE

(75) Inventor: Aaron S. Mendelsohn, Dobbs Ferry, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/578,270

(22) Filed: May 25, 2000

(51) Int. Cl.[7] ............................................... H04N 5/91
(52) U.S. Cl. ............................................ 386/83; 725/58
(58) Field of Search ................................ 386/1, 46, 83; 725/39, 40, 41, 44, 45, 50, 55–56, 152, 58; 360/27, 72.2, 69; 348/460, 552, 563, 564, 569

(56) References Cited

U.S. PATENT DOCUMENTS

| | | | |
|---|---|---|---|
| 5,488,409 A | * 1/1996 | Yuen et al. | ................... 386/83 |
| 5,517,321 A | 5/1996 | Yoshida | |
| 5,734,444 A | 3/1998 | Yoshinobu | |
| 6,014,184 A | * 1/2000 | Knee et al. | ................... 725/45 |
| 6,052,145 A | * 4/2000 | Macrae et al. | ................ 725/50 |
| 6,323,911 B1 | * 11/2001 | Schein et al. | ............... 348/552 |
| 6,470,497 B1 | * 10/2002 | Ellis et al. | ................... 725/39 |

FOREIGN PATENT DOCUMENTS

| | | |
|---|---|---|
| GB | 2268361 | 1/1994 |
| JP | 10247345 A | 9/1998 |

* cited by examiner

*Primary Examiner*—Thai Tran
*Assistant Examiner*—Christopher Onuaku
(74) *Attorney, Agent, or Firm*—Gregory L. Thorne

(57) ABSTRACT

A recording device that utilizes a determining device to make a determination whether a user is available to review user selected content at a scheduled time. First, the user makes a selection of content that the user wishes the recording device to record. The recording device then queries a database, such as an electronic programming guide (EPG) to determine the scheduled time of the user-selected content. The recording device then queries the determining device, such as a calendar device. In the event that the recording device determines that the user is unavailable at the scheduled time of the selected content, the recording device records the selected content.

15 Claims, 2 Drawing Sheets

METHOD AND APPARATUS TO ADAPTIVELY PROGRAM A RECORDING DEVICE

FIELD OF THE INVENTION

This invention generally relates to a method and apparatus for controlling a content recording apparatus. Specifically, the present invention pertains to utilizing user availability criteria to determine whether content should be recorded on a recording device.

BACKGROUND OF THE INVENTION

Recording devices, such as videocassette recording devices (VCRs), have the ability to record real-time content for later review. VCRs can be pre-programmed to record live television broadcasts. In a typical recording process, a user reviews either of a paper television program guide or electronic program guide (EPG) to determine what content a user wishes to record. A user typically does a mental calculation to determine what content the users wishes to record. This calculation may be based on the time in which the content is broadcast and a determination as to whether a user will be available to view the content at the broadcast time. Several factors may need consideration in determining whether a user will watch content as it is broadcast or will record it for later review. Factors such as the time of broadcast, conflicts with other broadcast content, and other scheduling matters such as work schedules and other appointment constraints.

VCRs are constructed such that they may be programmed often as much as a year in advance. However, it is recognized that the manual setup of a recording device, such as a VCR, is cumbersome. To facilitate the recording of regularly occurring broadcast content, such as weekly broadcast shows, a VCR can be programmed to record the same broadcast program each day or week. There are also other known systems that facilitate the recording of real-time content for later review. For example, VCRs utilize a system termed VCR Plus+™. VCR Plus+™ utilizes a program code that may be published in the program guide. The program code is entered into the VCR in the place of time and channel information. A VCR Plus+™ enabled VCR deciphers the program code and determines corresponding recording channel and start and stop times.

Other systems may utilize an electronic programming guide (EPG) to facilitate the recording of content. Hard disk based recording devices, such as a TIVO™ work in conjunction with the EPG to determine what should be recorded. The TIVO™ may be instructed by the user to record particular content indicated on an EPG or may simply be instructed to record particular content at a single or regularly occurring interval. The TIVO™ then may search the EPG for an occurrence of the indicated content. The TIVO™ may also make an independent determination as to whether the user may be interested in recording content based on a constructed user profile.

However, neither the TIVO™ nor the other prior art systems make a determination as to whether previously determined content should in fact be recorded at the time of broadcast. Oftentimes, the user may have initially thought that they would be available or unavailable to view content yet at the time of broadcast, the users scheduling has changed. In the prior art systems, the user must change the programming of the recording device to properly reflect these scheduling changes. This need for reprogramming further complicates user interaction with these recording devices.

Accordingly, it is an object of the present invention to overcome the disadvantages of the prior art.

It is a further object of the present invention to provide a method of facilitating the use and operation of a recording device.

SUMMARY OF THE INVENTION

These and other objects of the present invention are achieved by a recording device that utilizes a determining device to make a determination whether a user is available to review user selected content at a scheduled time. First, the user makes a selection of content that the user wishes the recording device to record. The recording device then queries a database, such as an electronic programming guide (EPG) to determine the scheduled time of the user-selected content. The recording device then queries the determining device, such as a calendar device. In the event that the recording device determines that the user is unavailable at the scheduled time of the selected content, the recording device records the selected content.

The recording device may determine if a medium, such as a videocassette tape, is available for recording the user selected content. In a case wherein a tape is unavailable to record the user selected content, the recording device may provide an indication to the user that a medium is unavailable. This indication may be in the form of a display icon on a television, an indication in the calendar device, etc.

The recording device may check the user availability to watch selected content more than once to determine whether the user scheduling has changed prior to the scheduled time of selected content. The recording device may also recheck the broadcast time of the selected content to determine whether the scheduled broadcast time has changed.

BRIEF DESCRIPTION OF THE DRAWINGS

The following are descriptions of embodiments of the present invention that when taken in conjunction with the following drawings will demonstrate the above noted features and advantages, as well as f further ones. It should be expressly understood that the drawings are included for illustrative purposes and do not represent the scope of the present invention. The invention is best understood in conjunction with the accompanying drawings in which.

DETAILED DESCRIPTION OF THE INVENTION

In the discussion to follow, certain terms will be illustratively discussed in regard to a specific embodiment or system to facilitate the discussion. However, as would be readily apparent to a person of ordinary in the art, these terms should be understood to encompass other similar applications and embodiments wherein the present invention could be readily applied. For example, the term content should be understood to include video content, audio content, text content, animation content, or any other content that may be reviewed, received, recorded, played, etc., in a given manner. In addition, content should be understood to include any combination of the above content types, such as audio-visual content. The term storage medium, memory, etc., should be understood to include storage mediums such as video tapes, audio tapes, etc., random access storage mediums, such as hard disks, digital video discs, other optical storage mediums, integrated circuit storage mediums, etc. Illustratively herein below an embodiment of the present invention will be discussed with regard to broadcast television content. As would be readily apparent to a person of ordinary skill in the art, other types of content such as discussed above can also be suitably utilized with the present invention.

For the illustrative embodiments, the present invention will be described with regard to the availability of a user to watch the television broadcast content. As would be readily apparent to a person of ordinary skill in the art, for television broadcast content, the term watch should be understood to include viewing and listening to the television broadcast content. Further, for other types of content, a person of ordinary skill in the art would readily appreciate that other forms of reviewing the content may be suitably employed without deviating from the scope of the present invention. Accordingly, the term watch should be understood to encompass all other suitable methods of reviewing other content such as listening to audio content, etc.

Figure 1:
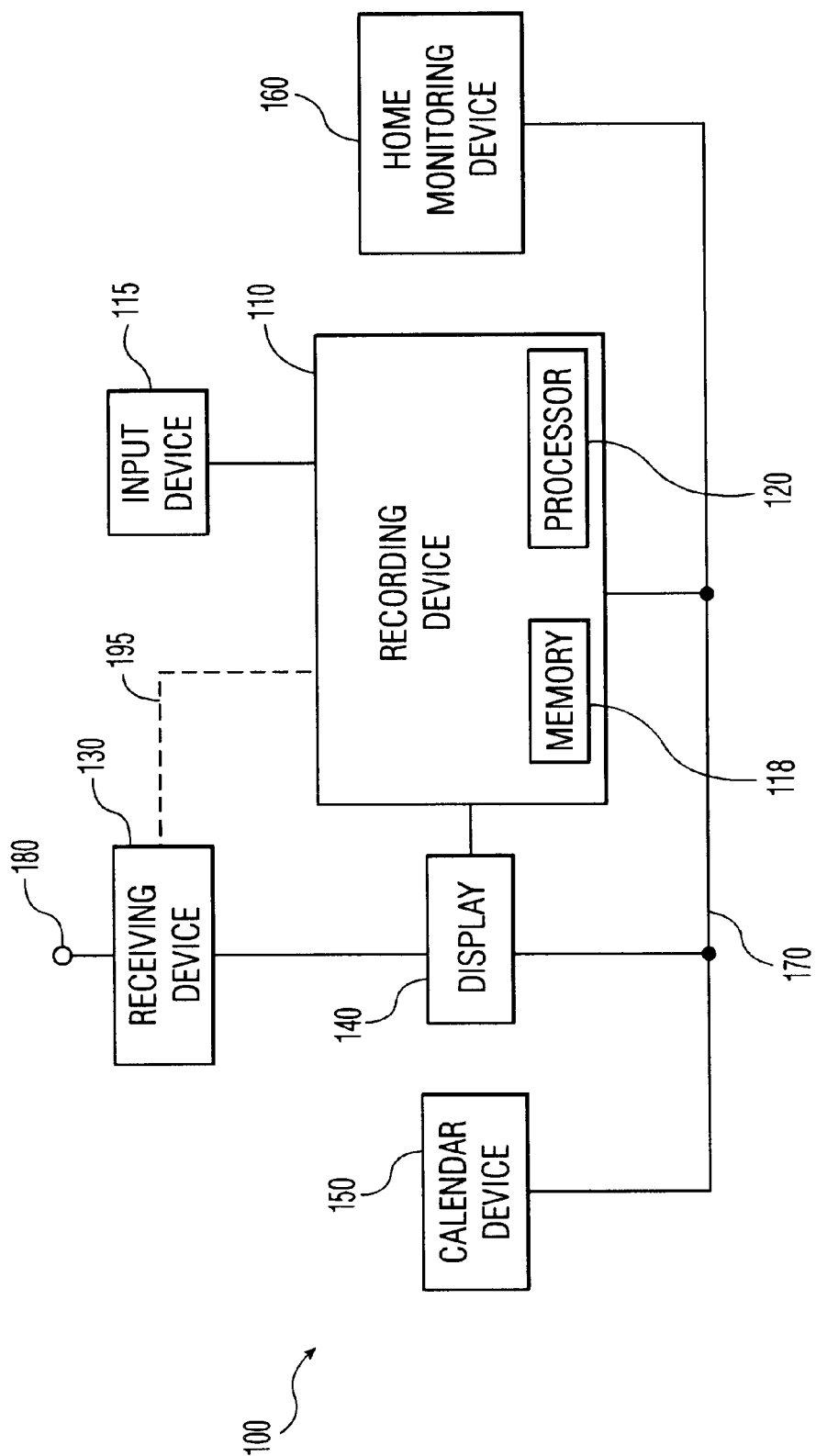
FIG. 1 shows an illustrative system in accordance with an embodiment of the present invention.

FIG. 1 depicts an illustrative system 100 in accordance with an embodiment of the present invention. In accordance with the present invention, the system 100 contains a recording device 110 for recording content. The recording device 110 contains a processor 120 that examines several user availability criteria and makes a determination whether to record the content as further discussed herein below.

The recording device 110 is connected to a display device 140 via at least one of a network connection 170, such as a local area network (LAN), and a direct connection 190. The connections 170, 190 enable the recording device 110 to display programming information and recorded content on the display device 140. The connections 170, 190 may also enable the recording device to receive EPG data from a receiving device 130 via the display device 140. The recording device 110 may also or alternatively connect directly to the receiving device 130 via a connection 195. The EPG may be continuously available to the recording device 110 from a receiving device 130 via a connection 180 and/or may be stored in the memory 118.

In these embodiments, the receiving device 130 may connect to a cable television connection via the connection 180. In other embodiments, the receiving device 130 may connect to a satellite dish antenna, a telephone connection, and/or an Internet connection via the connection 180. In some of these embodiments the receiving device 130 may correspond to a set top box (STB), a modem, a wireless transmitter, or any other suitable means for receiving EPG data, desired content, etc. In other embodiments the receiving device 130 may not be required and the connection 180 may connect directly to any of the display device 140 or the recording device 110 as illustratively shown via the connection 195. Further, the connection 170 may suffice as a connection to the EPG data, desired content, etc. In these embodiments, the connection 170 may be a home Intranet connection, an Internet connection, or some combination thereof. Clearly numerous other combinations would be apparent to a person of ordinary skill in the art.

In accordance with the present invention, the recording device 110 connects to a determining device to determine if a user is available to watch a desired television content portion (e.g., a television show) as described in more detail below. The determining device may include a calendar device 150, a home monitoring device 160, etc. The determining device is connected to the recording device 110 via the network connection 170, or via any other suitable connection, for determining whether a user is home and/or available to watch a desired television show.

The calendar device 150 may correspond to a personal digital assistant (PDA), a computer system, or any other system that may be electronically queried for user scheduling information. The home monitoring device 160 may correspond to a home alarm system, a light monitoring system, or any other home monitoring system that may be suitably utilized for determining whether the user is away from home. In some embodiments, the recording device 110 may additionally determine whether the user is home by monitoring the display device 140 to determine if the display device 140 is on. In one embodiment, the recording device 110 may determine if the display device 140 is on and particularly, what channel the display device 140 is tuned to.

Figure 2:
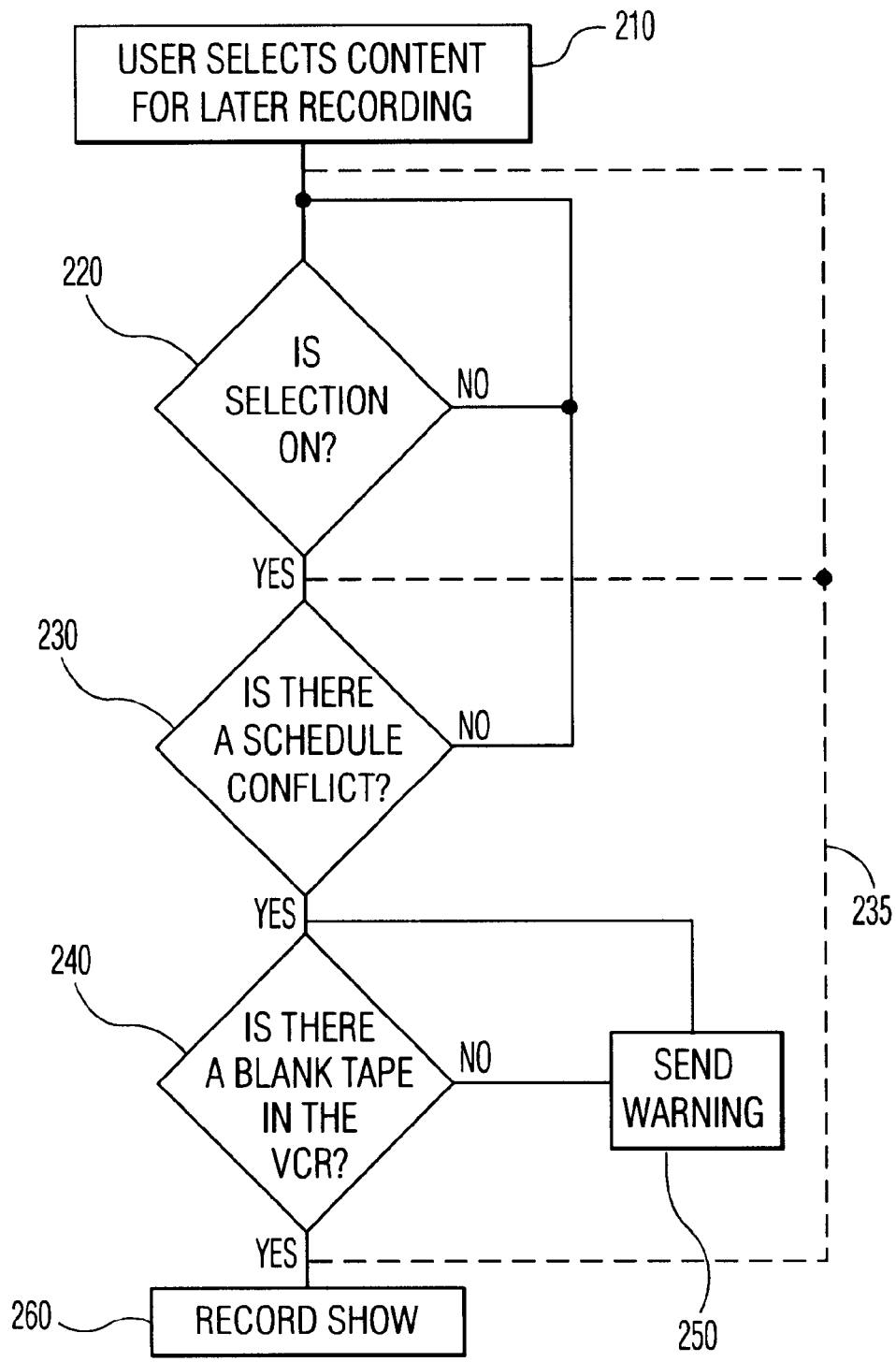
FIG. 2 shows a flow diagram illustrating the process steps that may be performed in accordance with the present invention.

FIG. 2 shows a flow diagram illustrating the process steps that may be performed by the present invention. FIGS. 1 and 2 will be discussed together herein below to illustrate the operation of the present invention. In operation, the user interacts with the recording device 110 via at least one of a wireless or wired input device 115. The input device 115 may contain a input keys, such as found in a common television remote control, a keyboard, a mouse, a trackball, etc. The recording device 110 contains a user interface for facilitating the user interaction via the input device 115 and the recording device 110.

In accordance with the present invention, at step 210, the user first selects a content portion that the user wishes to view at some later time, such as a television show series. The user may also select whether each occurrence of the selected television show should be recorded or whether only new occurrences of the television show should be recorded. The user may also further enter additional selections at this or a later time. These selections are stored by the processor 120 in a memory 118.

The recording device 110 at step 220 then queries the EPG to, search for occurrences of the selections. The recording device 110 is configured to recognize alternate forms of spellings for the selections. For example, if the user's selection is ER, alternate spellings such as er, Er, eR, and E.R. would be recognized. In the event that an occurrence of the selection is not found, the recording device 110 may subsequently continue to query the EPG to determine if an occurrence of the selection is upcoming. This feature may be useful to a user that desires to view a particular selection but is unaware of when it may be broadcast.

The recording device 110 may in alternate embodiments not utilize an EPG to search for an occurrence of the selection. In these embodiments the recording device 110 skips step 220 and may depend on the user properly entering programming information for a selected content portion or the recording device 110 may utilize a programming function such as VCR Plus+™.

In any event, when an occurrence of the selected television show is found in the EPG or properly programmed by the user, the processor 120, sometime thereafter, at step 230 queries at least one determining device such as the calendar device 150. The processor 120 queries the determining device to determine if the user is available at the time of the selected television show. In a case wherein the processor 120 determines that the user is unavailable at the time of the selected television show, the processor 120 then programs the recording device 110 to record the selected television show.

The querying of the determining device by the recording device 110 may occur shortly after the programming of the recording device or may occur some other time preferably prior to the scheduled broadcast time of the selected television show. In further embodiments, the recording device 110 may check if the user is available to watch a selected television show more than one time after the user completes programming the recording device. In these embodiments, the recording device 110 rechecks the user availability to watch a selected show to determine if the users scheduling constraints have changed as indicated by a dashed option path 235.

For example, at the time of programming, the user may be available to watch ER at ten P.M., Thursday. However, sometime thereafter, a meeting may be scheduled that would conflict with the user watching the television show. Advantageously, the recording device may query the determining device again prior to the scheduled time of the desired television show to determine if the user's scheduling constraints have changed. The converse case may also be checked to determine if a user is now available when initially the user may have been unavailable to watch the selected television show.

Further, the recording device 110 may determine the availability of the user to watch a selection by querying the home monitoring device 160 to determine whether a home alarm is set, whether lights are on, whether other audio-visual devices are on, etc. The recording device 110 may also query the display device 140 to determine if the display device 140 is on and what channel the display device is tuned to as discussed above. In the event that the recording device 110 determines that the display device is on and tuned to a different channel than the selection, the recording device 110 may produce a suitable reminder, such as a display icon, on the display device 140.

The display icon may enable the user to switch the display device to the selection, stop the recording device 110 from recording the selection, start a picture-in-a-picture (PIP) window of the selection, etc., or any combination thereof. Even in the event that the recording device determines that the display device is on and tuned to the selection, the recording device may produce the display icon to, confirm that the user does not wish to record the selection. This is useful in a case wherein multiple parties are interested in the selection yet only one party is available to watch it. In other cases the user may just wish to record the selection even if they are viewing it concurrently.

The recording device 110 may also make subsequent determinations whether the scheduled broadcast time of the selection has changed as indicated in FIG. 2. This ensures that the recording device 110 has current scheduling information at the broadcast time of the selection time if the recording device 110 determines that the selection should be recorded at that time. This updated scheduling information may be available through an always on EPG as discussed above, may be accessed on-demand via a dial-up connection, and/or may be stored in the memory 118.

In some embodiments, at step 240 the recording device 110 may determine whether a tape is available for recording the selected television show in the event that the recording device 110 should record the selected television program as described above. The recording device 110 may confirm that a tape is available (e.g., inserted into the recording device 110) and additionally may determine that there is sufficient recording space left on the tape to record the selected television show.

In a case wherein a tape is unavailable, the recording device 110 may at step 250 transmit to the user a suitable message to alert the user to the deficiency. For example, the recording device may transmit E-Mail to the user via the connection 180. Alternatively, the recording device 110 may transmit a message, to the calendar device 150 via the network 170, that an action is required from the user. This transmittal may occur immediately or some time thereafter when the calendar device 150 is connected to the recording device 110 (e.g. during synchronization of the calendar device 150). Further, the recording device 110 may produce a suitable reminder on the display device 140. In further embodiments, any combination of the above reminder systems may be implemented. In the event that no tape is available for recording the desired television show, the recording device 110 may subsequent to sending the reminder, perform step 240 again to determine if the user has corrected the deficiency. Alternatively, the recording device 110 may skip step 240 and try to record the desired television show without testing for the availability of the tape.

Subsequently, if the user is unavailable to watch the selected television show, at step 260 the recording device records the selected television show. As would be readily appreciated by a person of ordinary skill in the art, step 230 could also be performed subsequent to step 240 some time prior to the scheduling of the desired show to determine if recording is still necessary.

Finally, the above-discussion is intended to be merely illustrative of the invention. Numerous alternative embodiments may be devised by those having ordinary skill in the art without departing from the spirit and scope of the following claims. In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope; and d) several "means" may be represented by the same item or hardware or software implemented structure or function.

The claimed invention is:

1. A recording device comprising:
   a user input;
   a storage device; and
   a processor configured to receive a user selection of content from the user input, to thereafter automatically make a determination without any further input from the user, whether the user is available to review corresponding user selected content at a scheduled time, and to record the user selection on the storage device only if it is determined the user is unavailable to make the review.

2. The recording device of claim 1, wherein the processor is further configured to query a database to determine the scheduled time of the user selected content.

3. The recording device of claim 2, wherein the database is provided to the processor in the form of an electronic programming guide (EPG).

4. The recording device of claim 1, wherein the processor is configured to receive the user selection in the form of a VCR Plus™ program code from the user input.

5. The recording device of claim 1, wherein the processor is configured to determine if a medium is available to the recording device for recording the user selected content.

6. The recording device of claim 5, wherein the processor is configured to provide an indication to the user if a medium is not available to the recording device for recording the user selected content.

7. The recording device of claim 6, wherein the processor is configured to provide the indication to the user as at least one of an E-Mail message, a calendar indication, and an indication on a selection display device.

8. The recording device of claim 1, wherein said storage device is one of an analog storage medium, a local digital storage medium, and a server based storage medium.

9. The recording device of claim 1, wherein the user selected content is at least one of audio content, video content, and text content.

10. A method of programming a recording device comprising:
    receiving a user selection corresponding to user selected content;
    determining without any further action on the part of the user, whether the user is available to review the user selected content at a scheduled time; and operating said recording device to record the user selection only if it is determined the user is unavailable to make the review.

11. The method of claim 10, wherein determining comprises:

querying a determining device for user scheduling information; and comparing the user scheduling information to the scheduled time of the user selected content.

12. The method of claim 11, wherein querying comprises querying at least one of a calendar device, a home monitoring device, and a content display device.

13. The method of claim 10, wherein said determining step includes the steps of:

querying a home alarm system of the user; and indicating the user is unavailable if the alarm is turned on.

14. The method of claim 10, wherein said determining step includes the steps of:

querying a calendar device of the user; and indicating the user is unavailable if the calendar device provides information showing the user cannot be available to make the review at the scheduled time.

15. The method of claim 10, wherein said determining step includes the steps of:

querying a content display device; and indicating the user is available if said content display device is turned on.

* * * * *